Sept. 20, 1971   W. K. WHITLOCK   3,605,609
CHOKE JAW WITH REPLACEABLE WEAR SURFACE
Filed Sept. 5, 1969   2 Sheets-Sheet 1

Walter K. Whitlock
INVENTOR.

BY
Attorneys

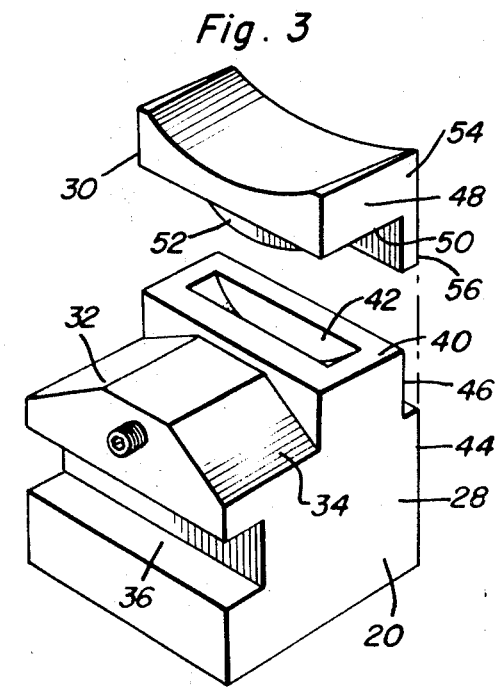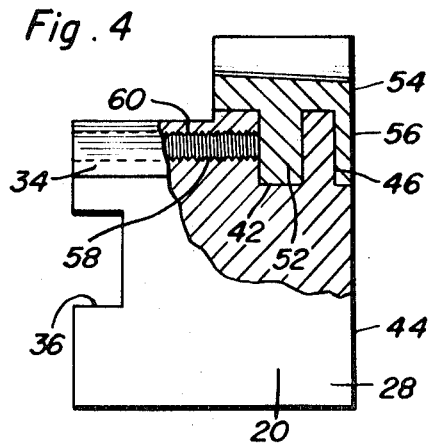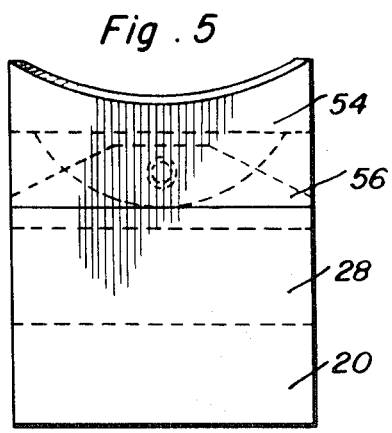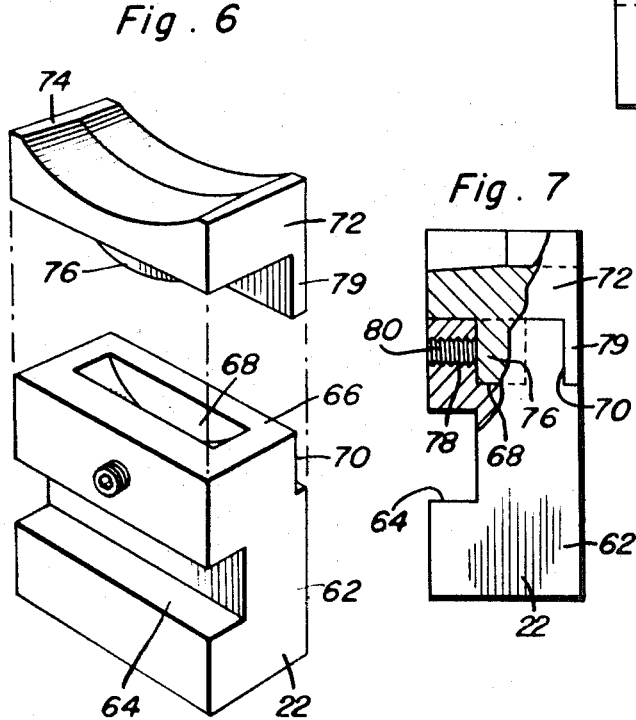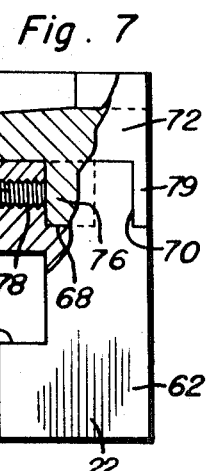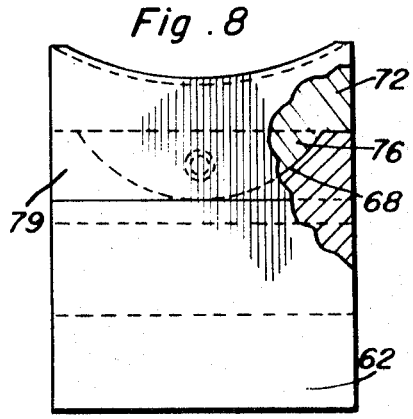
Walter K. Whitlock
INVENTOR.

United States Patent Office 3,605,609
Patented Sept. 20, 1971

3,605,609
CHOKE JAW WITH REPLACEABLE WEAR SURFACE
Walter K. Whitlock, P.O. Box 4021,
Corpus Christi, Tex. 78408
Filed Sept. 5, 1969, Ser. No. 855,533
Int. Cl. B30b *15/00*
U.S. Cl. 100—148    12 Claims

ABSTRACT OF THE DISCLOSURE

A working face insert for the choke jaw of a material press of the type wherein material is forced through an outlet choke structure defining a passage therethrough with which a plurality of choke jaws are operatively associated for varying the effective cross-sectional area of the passage formed through the outlet choke structure. The working face insert is supported from one of the choke jaws in a manner whereby the working face insert comprises that part of the choke jaw defining a partial restriction of the throat structure passage. The working face insert is removably supported from the associated choke jaw in a manner such that the entire choke jaw need not be replaced or reconditioned when the working face thereof becomes worn. Instead, the working face insert may be removed and replaced by a new insert.

---

The choke jaw of the instant invention includes a body portion which is adjustably supported from an associated press machine and the instant invention resides in the provision of a working face insert removably supported from the body of the choke jaw.

In a press machine such as that utilized to press oil from vegetables, the function of the choke jaw is to regulate the thickness and coarseness of the material being extruded through the machine. There are several choke jaws on each press. The top portion, or part of the jaw exposed to the roller and the material being extruded is subject to abrasion and wear. These choke jaws must be replaced frequently because of wearing and abrasion. It is customary at this time for a vegetable oil mill (mostly cottonseed oil mills) to break down the machine, remove the choke jaws and forward them to a hard-surfacing machinist. It is necessarily some time before the choke jaws can be shipped to the machinist and returned in reconditioned form. Further, shipping costs for shipping the entire jaw are relatively high and vegetable oil mills find that it is usually necessary for the choke jaws of their press machines to be replaced about twice a year.

The top part of the choke jaw of the instant invention, which is the part subject to abrasion and wear, is designed to be fitted to the base or body of the choke jaw having a tongue and groove connection with the latter and held in place by means of a setscrew. The top part or replaceable working face insert is made of highly wear resistant metal. The advantage of the choke jaw of the instant invention is that the oil mill may stock the top portion or wear face insert of the choke jaw and when abrasion has worn down the insert to such a point that resurfacing is necessary, the oil mill may simply withdraw the choke jaw and refit a new working face insert thereon, thereby avoiding the necessity of extended downtime of the machine and expensive cost of shipment.

It is accordingly the main object of this invention to provide a choke jaw for use in a vegetable oil press machine provided with a removable and replaceable working face insert.

Another object of this invention, in accordance with the immediately preceding object, is to provide an effective releasable connection between the insert and the body of the associated choke jaw whereby the working face insert will be stationarily supported from the body portion of the jaw and yet be readily removable therefrom for replacement when desired.

A still further object of this invention is to provide a working face insert including a portion thereof which will also overlie the upstream side of the adjacent portion of the associated choke jaw body thereby preventing abrasive wearing of that portion of the choke jaw body which is also subject to wear.

A final object of this invention to be specifically enumerated herein is to provide a device in accordance with the preceding objects which will conform to conventional forms of manufacture, be of simple construction and easy to install so as to provide a device that will be economically feasible, long-lasting and relatively trouble-free in installation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a fragmentary longitudinal vertical sectional view taken substantially upon a plane passing through a conventional form of vegetable oil press machine similar to that disclosed in U.S. Pat. No. 1,820,590;

FIG. 3 is an exploded perspective view of one of the wide choke jaws of the instant invention utilized on the press machine;

FIG. 4 is a side elevational view of the assembled choke jaw of FIG. 3 with portions thereof being broken away and illustrated in vertical section;

FIG. 5 is an end elevational view of the choke jaw illustrated in FIGS. 3 and 4 and as seen from the right side of FIG. 4;

FIG. 6 is an exploded perspective view of one of the narrow choke jaws utilized in the vegetable press machine;

FIG. 7 is a side elevational view of the assembled choke jaw of FIG. 6 with portions thereof being broken away and illustrated in vertical section; and FIG. 8 is an end elevational view of the choke jaw illustrated in FIGS. 6 and 7 as seen from the right side of FIG. 7 and with portions of the jaw being broken away and illustrated in vertical section.

Figure 1:
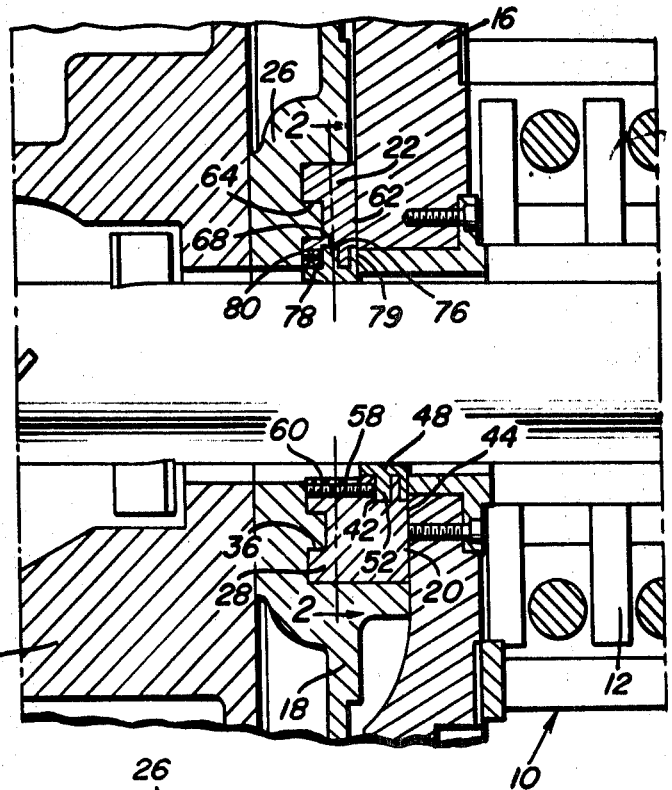
Figure 2:
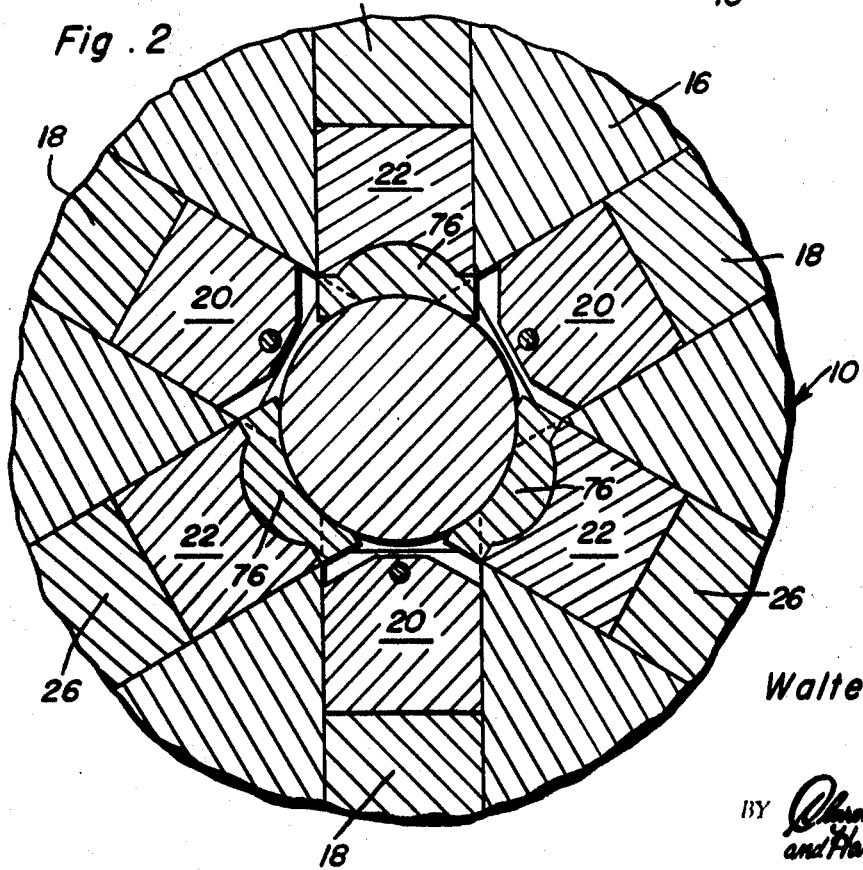
FIG. 2 is a fragmentary vertical transverse sectional view taken substantially upon the plane indicated by the section line 2—2 of FIG. 1.

Referring now more specifically to the drawings, the numeral 10 generally designates a conventional form of vegetable oil press which includes a horizontal barrel unit 12, a thrust sleeve 14, a choke casting 16, a choke jaw holder 18 and a plurality of wide and narrow choke jaws 20 and 22 supported from the choke jaw holder, as is conventional.

Conventional wide and narrow choke jaws have substantially the same total longitudinal, transverse and horizontal cross-sectional shapes as the choke jaws 20 and 22. However, conventional choke jaws are formed of one-piece construction.

The conventional wide choke jaws are supported by the jaw holders 18 and the conventional narrow choke jaws 22 are supported from the jaw holders 26.

As can best be seen from FIGS. 3–5 of the drawings, the wide choke jaw 20 includes a body portion 28 and a working face insert 30. The body 28 corresponds to the corresponding portion of the conventional wide choke jaw in that it is beveled as at 32 and 34 and provided with a transverse groove as at 36. However, the body 28 is foreshortened in radial extent on its inner end and is provided with an inner end face 40 which has a partial cylindrical recess 42 formed therein. In addition, the upstream face 44 of the body 28 is notched or relieved as at 46 adjacent the end face 40.

The insert 30 includes a body extension 48 having a surface 50 opposing the face 40 from which a partial cylindrical projection 52 snugly seatable within the recess 42 projects. In addition, the extension 48 includes an upstream face 54 and the extension 48 includes a flange 56 forming a continuation of the upstream face 54 and which projects outwardly of the surface 50 and is snugly seatable in the notch 46.

From FIG. 4 of the drawings it may thus be seen that the insert 30 comprises an extension of that portion of the body 28 which terminates at the face 40 and that the extension 48 includes two different projections extending outwardly of the surface 50 for snug seating in corresponding recesses defined in the body 28 therefor.

The body 28 is provided with a threaded longitudinal bore 58 which opens into the recess 42 and a setscrew 60 is threadedly engaged in the bore and its end adjacent the recess 42 bears against the projection 52 in order to lock the extension 48 in position on the body 28.

With attention now invited more specifically to FIGS. 6–8 of the drawings it may be seen that the choke jaw 22 includes a body 62 corresponding to the body 28 and which has a groove 64 formed therein corresponding to the groove 36. The body 62 includes an end face 66 corresponding to the face 40 in which a recess 68 is formed corresponding to the recess 42. Further, the body 62 is notched or relieved as at 70 and an extension 72 corresponding to the extension 48 and comprising a working face insert 74 is provided for the body 22. The extension 72 includes projections 76 and 78 corresponding to the projections 52 and 56 and the body 22 is provided with a threaded bore 79 corresponding to the bore 58 as well as a setscrew 80 corresponding to the setscrew 60.

It may therefore be seen that the inserts 30 and 74 are removably supported from the corresponding bodies 28 and 62 and that when the working face inserts 30 and 74 become worn, they may be readily replaced. Also, conventional choke jaws are quite massive and accordingly, shipping costs are greatly reduced when the inserts 30 and 74 need to be shipped to a machinist for reconditioning since the weight of the inserts 30 and 74 is appreciably less than the entire choke jaws 20 and 22.

Although replaceable wear surfaces for tools are old and well known in other fields, it will be noted from FIG. 1 of the drawings that it would be very difficult, if it were not for the instant invention, to provide a means of securely fastening a removable insert to the choke jaw bodies 28 and 62. Further, the instant invention has been designed in a manner whereby existing choke jaws may be readily cut down to form the body portions of the choke jaws of the instant invention thereby enabling conventional machines to be more economically converted. Also, the interfitting of two portions of each insert with the corresponding body in addition to the setscrew utilized to secure each insert to the corresponding body provides an extremely rigid manner of removably securing each insert to the corresponding body. Of course, it can be readily appreciated that precise and rigid positioning of the working faces of the choke jaws of the machine 10 is critical.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In combination with an outlet throat structure defining a passage therethrough having inlet and outlet ends through which material is to be discharged under compression, a plurality of die segment holders supported from said structure for guided adjustable movement generally along a plurality of circumferentially spaced radii of the center axis of said passage and including inner and outer ends, a die segment removably supported from each of said holders and defining an inner end extension thereof, said segments including body portions removably anchored to the inner ends of said holders and working portions projecting into said passage for varying the effective cross-sectional area of said passage, said working portions being removably supported from said body portions of said die segments, whereby replacement of the working portions due to wear may be accomplished without replacing the entire die segments.

2. The combination of claim 1 wherein said body portions are provided with mounting surfaces facing the center axis of said passage, said working portions being mounted on said body portions with base surfaces thereof opposing and abutting said mounting surfaces.

3. The combination of claim 2 wherein each of said mounting surfaces includes a recess formed therein and each of said working portions includes a projection projecting outwardly from the base surface thereof snugly received in the corresponding recess.

4. The combination of claim 3 wherein recesses and projections are generally partial cylindrical in shape with their axes of curvature generally paralleling the center axis of said passage.

5. In combination with an outlet throat structure defining a passage therethrough having inlet and outlet ends through which material is to be discharged under compression, a plurality of die segments supported from said structure for guided adjustable movement generally along a plurality of circumferentially spaced radii of the center axis of said passage and including working portions projecting into said passage for varying the effective cross-sectional area of said passage, said working portions being removably supported from the remainder of said die segments, whereby replacement of the working portions due to wear may be accomplished without replacing the entire die segments, said die segments including body portions supported from said structure and provided with mounting surfaces facing the center axis of said passage, said working portions being mounted on said segments with base surfaces thereof opposing and abutting said mounting surfaces, each of said mounting surfaces including a recess formed therein and each of said working portions including a projection projecting outwardly from the base surface thereof snugly received in the corresponding recess.

6. The combination of claim 5 wherein said recesses and projections are generally partial cylindrical in shape with their axes of curvature generally paralleling the center axis of said passage.

7. The combination of claim 5 wherein said body portions include faces thereof adjoining said mounting surfaces and facing toward the inlet end of said passage and adjacent said mounting surfaces, said faces each being relieved in the areas thereof adjacent said mounting surfaces, said working portions including flange portions thereof projecting outwardly beyond said base surfaces and seated in said relieved areas.

8. A choke jaw for removable support from a jaw holder of a vegetable oil press of the type including a center axis about which a plurality of jaw holders including inner and outer ends are mounted for shifting generally radially of said axis, said jaw including an inner working end portion and an outer mounting end for removable support from the inner end of a corresponding jaw holder, said working end portion being removably supported from said outer mounting end of said jaw, whereby replacement of the working portion due to wear may be accomplished without replacing the entire jaw.

9. A choke jaw for use in a vegetable oil press, said jaw including an inner working end portion and an outer mounting end for support from a jaw support of a vegetable oil press including an outlet throat structure defining a passage therethrough generally along a radius of which said jaw support is shiftable, said working end portion being removably supported from the mounting end of said jaw, whereby replacement of the working portion due to wear may be accomplished without replacing the entire jaw, said mounting end of said jaw including an inner end mounting surface and said working end portion including a base surface opposing and abutting said mounting surface, said mounting surface including a recess formed therein and said working end portion includes a projection projecting outwardly from said base surface snugly received in said recess.

10. The combination of claim 9 wherein said recess and projection are generally partial cylindrical in shape.

11. A choke jaw for use in a vegetable oil press, said jaw including an inner working end portion and an outer mounting end for support from a jaw support of a vegetable oil press including an outlet throat structure defining a passage therethrough generally along a radius of which said jaw support is shiftable, said working end portion being removably supported from the mounting end of said jaw, whereby replacement of the working portion due to wear may be accomplished without replacing the entire jaw, said mounting end of said jaw including an inner end mounting surface and said working end portion including a base surface opposing and abutting said mounting surface, said mounting end including a face thereof adjoining said mounting surface and which is adapted to face toward the inlet end of the throat structure passage, said face relieved in the area thereof adjacent said mounting surface, said working end portion including a flange portion projecting outwardly beyond said base surface and seated in said relieved area.

12. The combination of claim 11 wherein said mounting surface includes a recess formed therein and said working end portion includes a projection projecting outwardly from said base surface snugly received in said recess.

References Cited
UNITED STATES PATENTS

| | | | |
|---|---|---|---|
| 890,112 | 6/1908 | Wheelwright | 100—148 |
| 1,752,054 | 3/1930 | Anderson | 100—148 |
| 1,752,222 | 3/1930 | Anderson | 100—148 |

BILLY J. WILHITE, Primary Examiner